June 30, 1953 J. N. WILLIAMS 2,643,577
STEREOSCOPIC VIEWING DEVICE
Filed March 8, 1951 2 Sheets-Sheet 1
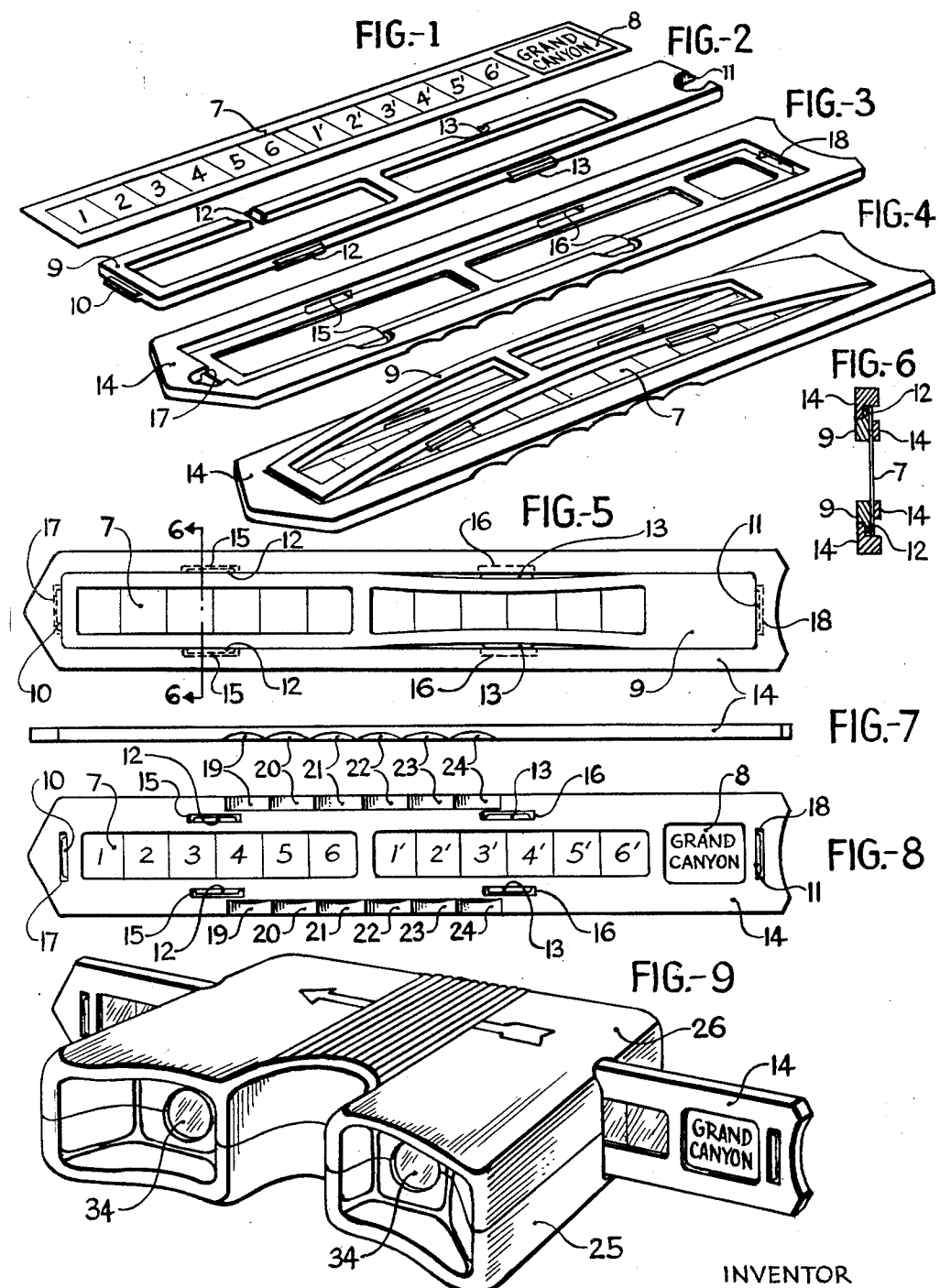
INVENTOR
John Nelson Williams June 30, 1953  J. N. WILLIAMS  2,643,577
STEREOSCOPIC VIEWING DEVICE
Filed March 8, 1951  2 Sheets-Sheet 2
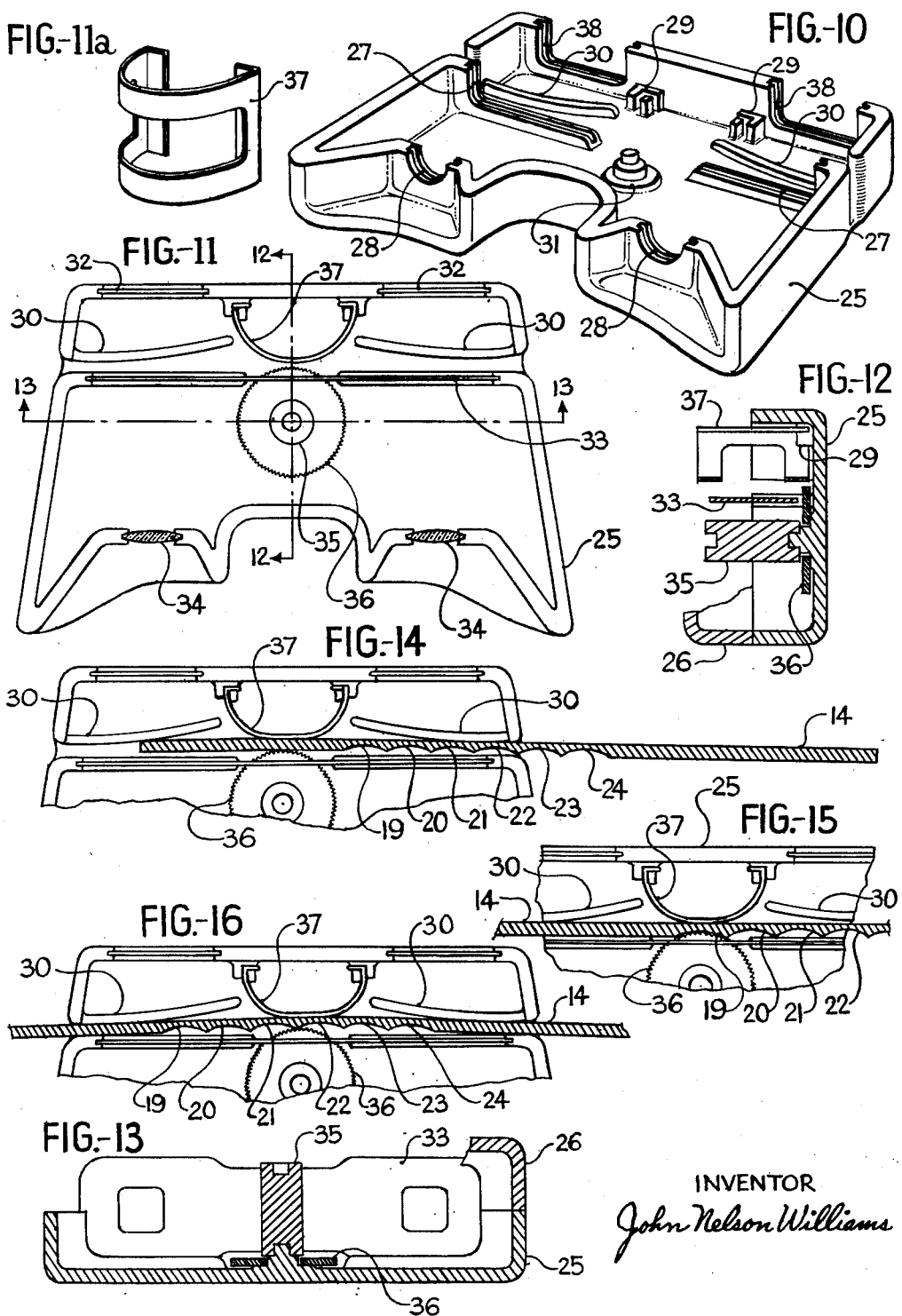
INVENTOR
John Nelson Williams Patented June 30, 1953

2,643,577

UNITED STATES PATENT OFFICE 2,643,577

STEREOSCOPIC VIEWING DEVICE

John Nelson Williams, New York, N. Y.

Application March 8, 1951, Serial No. 214,473

6 Claims. (Cl. 88—31)

This invention relates to a device for viewing stereoscopic pictures.

The main object of this invention is to construct a viewing device which will allow a continuous strip of transparency film mounted in an arrow-shaped plastic frame to be pushed through the viewing member and automatically bring each successive picture into correct alignment for viewing through the optical lenses of the device.

The second object is to provide a viewing member which will allow the plastic film frame to be inserted from either end, no directions being required as to which side of the viewing member should be uppermost for insertion of the plastic film frame since both sides are identical.

The third object is to mount a continuous strip of motion picture film bearing stereoscopic images into an arrow-shaped frame molded in two plastic parts in a quick and simple manner, without requiring any bonding of the parts, and resulting in a film with stereoscopic images mounted permanently and inexpensively in a plastic frame which may be molded in a wide variety of colors for added attraction.

The fourth object is to provide a plastic film frame having a series of arced indentations molded therein which when pushed against a serrated moving wheel within the viewing member bring the successive images into position by means of an alternating flexing and straightening action of the plastic film frame.

The fifth object is to provide a device of the class described wherein is included means for indicating the title of the various views shown on the continuous strip of film mounted in the plastic frame.

These and other objects are accomplished in the manner set forth in the following sepcification, and as illustrated in the accompanying drawings, in which:

Fig. 1 is a perspective view showing a strip of motion picture film on which are photographed two successive series of pictures, the first series of six or more or less pictures to be viewed through the lens of the viewing member by the left eye, followed by a second series of six or more or less pictures to be viewed by the right eye, followed by a blank section of the film strip on which is mounted a printed title of the pictures comprising the film strip.

Fig. 2 is a perspective view of the plastic insert member of the film frame.

Fig. 3 is a perspective view of the plastic receptacle member of the film frame.

Fig. 4 is a perspective view showing the plastic receptacle member of the film frame wherein the strip of film has been laid with its title face down, and showing the first step in assembling the plastic insert member into the plastic receptacle member to complete the film frame.

Fig. 5 is a front elevation of the partially assembled plastic film frame, showing the final step in assembling the insert member into the receptacle member.

Fig. 6 is a section taken along the line 6—6 in Fig. 5.

Fig. 7 is an end view of Fig. 5.

Fig. 8 is an elevational view of Fig. 7, showing the opposite side of the film frame as shown in Fig. 5.

Fig. 9 is a perspective view of the complete stereoscopic viewing device, showing the assembled plastic film frame inserted in the viewing member so that one of the series of stereoscopic pictures is in position to be viewed through the lenses of the viewing member. In the illustration, several of the pictures have already been viewed and other pictures remain to be viewed.

Fig. 10 is a perspective view of the plastic case molded in one integral unit, the viewing member itself being constructed from two of these identical plastic molded cases.

Fig. 11 is a plan view of the assembled viewing member, with the top case removed for clarity.

Fig. 11a is a perspective detail of the spring shown in Fig. 11.

Fig. 12 is a section taken along the line 12—12 in Fig. 11.

Fig. 13 is a section taken along the line 13—13 in Fig. 11.

Fig. 14 is a partial sectional plan view showing the plastic film frame being inserted into the viewing member of the device.

Fig. 15 is a partial view similar to Fig. 14, in which the film frame has been pushed into the viewing member far enough to bring the first stereoscopic picture into viewing position.

Fig. 16 is a view similar to Fig. 14, showing the flexing action of the film frame as it is pushed through the viewing member midway in the process of bringing another stereoscopic picture in position to be viewed.

Similar numerals refer to similar parts throughout the several views.

Referring in detail to the drawings, the present invention consists of two main parts, a plastic frame in which is mounted a series of stereoscopic views on film, and a viewing member containing two lenses and mechanical parts which allow the film frame to be inserted and pushed through the viewing member in such manner as to bring each stereoscopic picture automatically into position for viewing. When the last picture has been viewed, the film frame may be withdrawn from the viewing member by pulling it out from the left side of the viewing member, in a continuation of the picture-viewing movement. If desired, the film frame may also be removed by pulling it back out to the right of the viewing member, in which case the series of pictures are once again brought into view but in reverse order.

The film frame consists of two plastic molded parts 9 and 14, and the film strip 7. As illustrated in Fig. 1, film strip 7 is a continuous strip of transparency color film, preferably standard 16 millimeter motion picture film, having a series of pictures 1, 2, 3, 4, 5 and 6 followed by a succeeding series of pictures 1', 2', 3', 4', 5' and 6', wherein 1 and 1' combine to form a composite view necessary to form a stereoscopic picture, and 2 and 2' combine to form one picture, et cetera. It is desirable to have the separation of the two series of pictures, such as 1 and 1', approximately the width of the average eyes apart, namely 63 millimeters. Following these two series of pictures an unexposed portion of the film strip is left onto which is attached by adhesive a separate printed paper title 8. Film strip 7 is not shown here in assembly position, as are parts 9 and 14, but must be turned face down to assemble into part 14.

The plastic molded insert member 9 of the film frame, as shown in Fig. 2, has two long picture apertures designed to coincide with the two series of pictures on film strip 7. On each outer end of 9 two protruding ridges 10 and 11 are formed. Along the longitudinal outer edges, and centrally located with respect to the two picture apertures, are molded similar protruding ridges 12 and 13. These six ridges 10, 11, 12 and 13 are flush with the bottom surface of 9 but are lower than the top surface, as will be seen more clearly in Fig. 6.

The plastic molded receptacle member 14 of the film frame is shown in Fig. 3, and is shaped in the form of an arrow to make visually apparent the position and method of inserting it into the viewing member. Receptacle member 14 has a solid and rigid walled section on the outer periphery and an inner rectangular thin-walled recess designed to receive the film strip 7 and plastic insert member 9. The thin-walled recess area of 14 has two long picture apertures designed to coincide with the picture apertures of insert member 9 and the two series of pictures on film strip 7, and a short picture aperture to frame the printed title 8 mounted on film strip 7. In addition, receptacle member 14 contains six undercut grooves located at the juncture of the solid rigid walled section and the thin-walled recess area. Grooves 17 and 18 are located at the ends of the recessed area and designed to receive the protruding ridges 10 and 11 of insert member 9. Grooves 15 and 16 are centrally located with respect to the two long picture apertures and are designed to receive the protruding ridges 12 and 13 of insert member 9. Fig. 6 more clearly illustrates the assembled state of these parts.

The quick and simple assembly of parts 7, 9 and 14 to make the finished film frame are illustrated in Figs. 4 and 5. In Fig. 4, film strip 7 has been placed face down into the matching recessed area of receptacle member 14, and insert member 9 is in the first process of being assembled into receptacle member 14. The ends of insert member 9 are bent downward thus bowing insert member 9 so that ridges 10 and 11 may be easily slid into the corresponding receiving grooves 17 and 18 of member 14. In Fig. 5, the final stage in the assembly of insert member 9 into receptacle member 14 is illustrated. Due to the long thin sections of 9 which form the top and bottom of the picture apertures and which contain in their outside center area the protruding ridges 12 and 13, these long thin sections are able to be bent inwardly and pressed down into the corresponding receiving grooves 15 and 16 of member 14. Both steps in this assembly are possible only because of the long thin sections inherent in the design of insert member 9, which allow considerable bending of the sections of plastic and thus allow the protruding ridges to be set into the grooves of the receptacle member. In Fig. 5, ridges 12 are shown already assembled into grooves 15, and ridges 13 are shown bent inwardly ready to be assembled into grooves 16.

Fig. 7 is an end view of Fig. 5, and Fig. 8 is an elevation view of Fig. 7. Fig. 8 shows the assembled film frame in position to be inserted in the viewing member, and more clearly illustrates the mechanical assembly of the parts comprising the film frame. In Figs. 7 and 8 are clearly shown the arced indentations 19, 20, 21, 22, 23 and 24 molded into the walled section of receptacle member 14, along the top and bottom edges. Each of these arced indentations is situated in the center of each of the two pictures which comprise one stereoscopic view, arced indentation 19 is located midway between picture 1 and 1', 20 is located midway between picture 2 and 2', et cetera.

Referring now to the viewing member of the device, Fig. 9 is a perspective view of this viewing member with the film frame inserted into the slot running through said viewing member. Each outer face of this viewing member has an arrow design which faces to the left and is directly over the slot which receives the film frame, and in conjunction with the arrow shape of the film frame gives added visual indication of the manner in which said film frame is to be inserted into the slot of this viewing member.

The enclosing case of the viewing member is composed of two identical plastic molded parts 25 and 26. Fig. 9 shows the two parts assembled by bonding of the abutting surfaces of the two parts in the center plane of the viewing member. Fig. 10 is a view of one of the molded parts 25 and clearly shows the manner in which the enclosing case is designed for quick and easy assembly of the various parts to form the finished viewing member. Grooved openings 38 receive the diffusing glasses 32, the protruding forms 29 are made to receive spring 37, the grooved wing shapes of 27 receive the opaque window card 33, the hub form 31 is made to receive wheels 36 and spacer 35, and the semi-circular grooved portions 28 are made to receive the lenses 34. Also shown in Fig. 10 are curved runners 30, which guide the film frame in its movement through the viewing member. Assembly of these parts is more clearly shown in Figs. 11, 12 and 13 in which the top case 26 and its corresponding wheel 36 have been removed in these views for clarity.

Fig. 11a is a perspective view of metal spring 37. Opaque window card 33 may be made of cardboard or light metal, die-cut. Wheels 36 and spacer 35 may be made of plastic or light metal. Wheels 36 have edges which are serrated all around.

If the assembled viewing member were to be cut through the horizontal plane in the center, where the two cases 25 and 26 are bonded, it would be seen that the two halves including all the mechanical parts would be identical. It is this feature in the design of the viewing member which allows it to operate equally well no matter which of the outer surfaces bearing the arrow design is uppermost, so that no directions need be given to the user to indicate how the viewing member must be held to be in proper position for use, since any position in which the viewing member may happen to be held would be correct as long as the eyes are brought into alignment with the viewing lenses of said viewing member. All the mechanical operations of the viewing member in conjunction with the film frame are identical in either position.

Figs. 14, 15 and 16 show the picture registering mechanism of the viewing device in operation. For greater clarification of this mechanism, the top case 26 and its corresponding wheel 36 have been removed and film frame 14 is shown as a section cut through the lower series of arced indentations in these three views.

In Fig. 14 the assembled film frame 14 has been inserted into the slot at the right hand side of the viewing member and has been pushed in a sliding movement beyond the wheel 36 and spring 37. This smooth section of the film frame is pushed outward against the spring by the protruding edge of wheel 36 and is guided back toward the left hand slot of the viewing member by means of runners 30, this action resulting in an outward flexing of the film frame. In Fig. 15 this movement has been carried further until the wheel 36 has been brought into contact with the first of the arced indentations 19 of the film frame. The meeting of these two mating parts is a positive action, and has brought the first of the series of stereoscopic pictures in position to be viewed. It will also be noted in this position the film frame has snapped back into a straight position and is no longer flexed. In Fig. 16 the film frame is shown midway in the process of bringing another picture into position for viewing in the viewing member, and is again flexed. As will be seen quite clearly in Figs. 15 and 16, the positive action of the arced indentations acting against the wheel of the viewing member results in quick and accurate registering of the successive series of pictures being viewed. The particular method exemplified here of accomplishing this result is an improvement over methods developed in prior art because the sharp ridge formed by the edges of two of the arced indentations engages one of the serrations of the wheels 36 and moves said wheel 36 in a positive and swift movement to the point where wheel 36 is in contact with its mating part, the arced indentation, and resulting in a mild locking action which is only broken when pressure is applied to the film frame to repeat the movement and bring still another picture into viewing position.

Although I have shown and described certain specific embodiments of the invention, I am fully aware that many modifications thereof are possible. My invention, therefore, is not to be restricted except insofar as is necessitated by the scope of the appended claims.

Having thus described my invention what I claim and desire to be secured by Letters Patent of the United States is:

1. A film frame in which is mounted a transparency film strip bearing two successive series of pictures which combine to form stereoscopic pictures and bearing on one end a title describing said pictures, said film frame being assembled from two plastic molded parts, one part being a rigid receptacle member having a long rectangular walled section from which extends a thin-walled recess having two long picture apertures to coincide with the two series of pictures on the film strip, said recess having at one end a short picture aperture to coincide with the picture title of said film strip, the second plastic part of the film frame being a flexible insert member of a shape to coincide with the recessed area of said receptacle member and having two long picture apertures coinciding in superposed relation with the picture apertures of said receptacle member and the two series of pictures on said film strip, the aforementioned receptacle member having six integrally molded undercut grooves at the junction of the walled section and thin-walled section designed to receive protruding ridges formed on the aforementioned flexible insert member in a mating fit, said two parts being fitted together by bending of the long thin sections of plastic which form the flexible insert member.

2. A film frame according to claim 1 including a series of arced indentations formed along both outer longitudinal sides of the receptacle member and centrally located with respect to the two series of pictures on the film strip and with respect to the two coinciding long picture apertures of the insert member and receptacle member, the length of said series of arced indentations being equal to one of the series of pictures on the film strip and its two coinciding picture apertures, each arced indentation being the same longitudinal dimension as and located midway between each pair of corresponding pictures on the film strip which comprise one stereoscopic picture.

3. In a stereoscopic viewing device, a casing formed of two identical plastic molded parts which have formed therein grooved means for mounting respectively two viewing lenses, a card bearing two picture windows, two window diffusing glasses and a metal spring, said two parts of said casing also having formed therein two hubs for mounting two wheels with serrated edges and one spacer between said wheels, said casing having slotted means for insertion of a plastic molded film frame mounting two successive series of transparencies on a film strip, said viewing lenses mounted in said casing having a line of sight adapted to register with the two picture windows of the aforementioned card and with each pair of stereoscopic pictures mounted in said film frame, said casing having curved runners molded therein to guide said film frame through the slot of said casing, a series of arced indentations formed along both outer longitudinal sides of said film frame which act against the aforementioned two serrated wheels mounted in said casing to alternately turn said wheels while said film frame is thus flexed outward against the aforementioned spring, followed by mating of the arced indentations with said wheels which results in straightening of said film frame in the slot of said casing, and resulting in positive means of viewing each successive stereoscopic pair of pictures mounted in said film frame, said casing and all its component parts being so arranged that each of its halves deriving from the horizontal center plane are identical, so that said casing may be held with either face uppermost for insertion of the film frame into whichever end of the slot should be on the right-hand side.

4. In combination, a transparency film strip bearing two successive series of pictures followed by a printed title mounted thereon, said film strip seated between two plastic molded film frame members of long rectangular shape, the receptacle member of said film frame having a long rectangular walled section from which extends a thin-walled recess and having six integrally molded under-cut grooves at the junction of the walled section and thin-walled section of a shape and form to receive in nesting action the insert member which has protruding ridges formed on its outer periphery of a shape and form to fit into said six grooves of said receptacle member, assembly of the ridges at each end of the insert member into the grooves at each end of the receptacle member being accomplished by bowing and bending downward the ends of said insert member until said ridges slide into said grooves, assembly of the ridges at each side of said insert member into the grooves at each side of said receptacle member being accomplished by bending inward each long rectangular flexible plastic section running along each side of said insert member and pressing down and releasing said section containing a ridge into the mating undercut groove of said receptacle member, said two film frame members being each provided with two long equally-spaced picture apertures both of which coincide in superposed relation to jointly frame the two series of pictures on said film strip, the receptacle member being provided at one end with an additional short picture aperture to coincide with the title of said film strip, a plastic molded casing having slotted means for insertion from the right hand side of the film frame formed by the aforementioned assembly of said film strip into the two said film frame members, a pair of viewing lenses mounted in said casing whose line of sight is adapted to register with each pair of stereoscopic pictures mounted in said film frame, a series of arced indentations formed along both outer longitudinal sides of the receptacle member of said film frame which act against two serrated wheels mounted in said casing to alternately turn said wheels while said film frame is flexed outward against spring containing means, followed by mating of arced indentations with said wheels which results in straightening of said film frame in the slot of said casing, this repetitive movement actuated by manually pushing said film frame through the slot of said casing, and resulting in positive means of viewing each successive stereoscopic pair of pictures mounted within the film frame.

5. In combination, a film frame and casing according to claim 4 in which the film frame has the approximate shape of an arrow, with the head of the arrow on the left side of the film frame in viewing position, and in which the casing contains on both faces an imprint of the design of an arrow pointing to the left and located parallel to and just over the slot of said casing in which said film frame is inserted, making visually apparent the position and method of inserting said film frame into the slot of said casing.

6. As an article of manufacture, a film frame in which is mounted a transparency film strip bearing two successive series of pictures which combine to form stereoscopic pictures and bearing on one end a title describing said pictures, said film frame being assembled from two plastic molded parts, one part being a rigid receptacle member having a long rectangular walled section from which extends a thin-walled recess having two long picture apertures to coincide with the two series of pictures on the film strip, said recess having at one end a short picture aperture to coincide with the picture title of said film strip, the second plastic part of the film frame being a flexible insert member of a shape to coincide with the recessed area of said receptacle member and having two long picture apertures coinciding in superposed relation with the picture apertures of said receptacle member and the two series of pictures on said film strip, the aforementioned receptacle member having six integrally molded undercut grooves at the junction of the walled section and thin-walled section designed to receive protruding ridges formed on the aforementioned flexible insert member in a mating fit, said two parts of said film frame being fitted together by bending of the long thin sections of plastic which form the flexible insert member, said film frame having in addition a series of arced indentations molded into both outer longitudinal sides of the receptacle member and centrally located with respect to the long transparency film strip and with respect to the long picture apertures of both film frame members, a casing formed of two identical plastic molded parts which have formed therein grooved means for mounting respectively two viewing lenses, a card bearing two picture windows, two window diffusing glasses and a metal spring, and which also have formed therein two hubs for mounting two wheels with serrated edges and one spacer between said wheels, said casing having slotted means for insertion of the aforementioned film frame, said viewing lenses mounted in said casing having a line of sight adapted to register with the two picture windows of the aforementioned card and with each pair of pictures mounted in said film frame, said casing having curved runners molded therein to guide said film frame through the slot of said casing, the arced indentations of said film frame acting against the two serrated wheels mounted in said casing to alternately turn said wheels while said film frame is thus flexed outward against the aforementioned spring, followed by mating of the arced indentations with said wheels which results in straightening of said film frame in the slot of said casing, and resulting in positive means of viewing each successive pair of pictures mounted in said film frame, said casing and all its component parts being so arranged that each of its halves deriving from the horizontal center plane are identical, so that said casing may be held with either face uppermost for insertion of the film frame into whichever end of the slot should be on the right-hand side.

JOHN NELSON WILLIAMS.

References Cited in the file of this patent

UNITED STATES PATENTS

| Number | Name | Date |
|---|---|---|
| 1,949,067 | Wheelock et al. | Feb. 27, 1934 |
| 2,093,746 | White et al. | Sept. 21, 1937 |
| 2,528,366 | Houston | Oct. 31, 1950 |

FOREIGN PATENTS

| Number | Country | Date |
|---|---|---|
| 675,940 | France | Nov. 18, 1929 |
| 40,304 | France | Feb. 23, 1932 |
| | (First Addition to No. 689,780) | |